(12) United States Patent
Shah (10) Patent No.: US 8,362,894 B2
(45) Date of Patent: Jan. 29, 2013

(54) METHODS AND SYSTEMS FOR PROVIDING DEPARTURE NOTIFICATION FROM A TRAVEL ASSISTANCE SYSTEM

(75) Inventor: Rupal Bhavin Shah, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 12/609,481

(22) Filed: Oct. 30, 2009

(65) Prior Publication Data

US 2010/0109861 A1    May 6, 2010

Related U.S. Application Data

(60) Provisional application No. 61/110,515, filed on Oct. 31, 2008.

(51) Int. Cl.
*G08B 19/00* (2006.01)
*G08G 1/123* (2006.01)

(52) U.S. Cl. ............. 340/522; 340/994; 701/465; 705/6

(58) Field of Classification Search ........... 340/522, 340/994; 701/465
See application file for complete search history.

(56) References Cited

U.S. PATENT DOCUMENTS

| | | | | |
|---|---|---|---|---|
| 5,999,882 A | * | 12/1999 | Simpson et al. | 702/3 |
| 6,317,686 B1 | * | 11/2001 | Ran | 701/533 |
| 7,610,145 B2 | * | 10/2009 | Kantarjiev et al. | 701/527 |
| 2008/0208441 A1 | * | 8/2008 | Cheung | 701/117 |

* cited by examiner

*Primary Examiner* — Donnie Crosland (57) ABSTRACT

Methods and systems for providing a departure notification from a travel assistance system are disclosed. A source location, a destination location and a desired destination arrival time are received at a travel assistance system. At least one travel parameter operable to affect departure time from the source location to the destination location is received at the travel assistance system. A departure time from the source location that enables arrival at the destination location at approximately the desired destination arrival time based on the source location, the destination location, the desired destination arrival time and the at least one travel parameter is determined. A departure notification is issued from the travel assistance system to a client system. The departure notification includes the departure time.

20 Claims, 3 Drawing Sheets

METHODS AND SYSTEMS FOR PROVIDING DEPARTURE NOTIFICATION FROM A TRAVEL ASSISTANCE SYSTEM

CROSS-REFERENCE TO RELATED APPLICATIONS

This application claims the benefit of U.S. Provisional Application Ser. No. 61/110,515, filed Oct. 31, 2008.

FIELD OF THE INVENTION

The present invention generally relates to travel assistance and more particularly to systems and methods for providing a departure notification from a travel assistance system.

BACKGROUND OF THE INVENTION

People are often faced with an increasing number of time sensitive commitments and demands on their time. Many such commitments involve departing from an initial or source location in a timely manner to travel to a destination location where the destination location is the location of the scheduled event or appointment. Examples of scheduled events and/or appointments include, but are not limited to, meetings, appointments with doctors and flight departures.

It is often difficult for an individual to effectively determine a departure time from a source location that will enable the individual to arrive at the destination location in time for a scheduled event. In some cases, a number of different variables may impact the time it takes for an individual to travel from the source location to the destination location. At other cases, there may be delays at the destination location that may impact the ability to attend the scheduled event in a timely manner.

The events that impact travel time and/or result in delays are sometimes unexpected in nature. It is often difficult to account for such unexpected delays in determining a departure time from the source location that enables a timely arrival at the destination location. Furthermore, departing from the source location significantly earlier than necessary to make allowances for such unexpected delays may result in an undesirable waste of time.

SUMMARY OF THE INVENTION

On aspect of the invention is directed to a method of providing a departure notification from a travel assistance system. A source location, a destination location and a desired destination arrival time are received at a travel assistance system. At least one travel parameter operable to affect departure time from the source location to the destination location is received at the travel assistance system. A departure time from the source location that enables arrival at the destination location at approximately the desired destination arrival time based on the source location, the destination location, the desired destination arrival time and the at least one travel parameter is determined. A departure notification is issued from the travel assistance system to a client system. The departure notification includes the departure time. Another aspect of the invention is directed to a computer readable medium storing a computer executable program for providing a departure notification from a travel assistance system. Yet another aspect of the invention is directed to a system for providing a departure notification from a travel assistance system.

DETAILED DESCRIPTION

Figure 1:
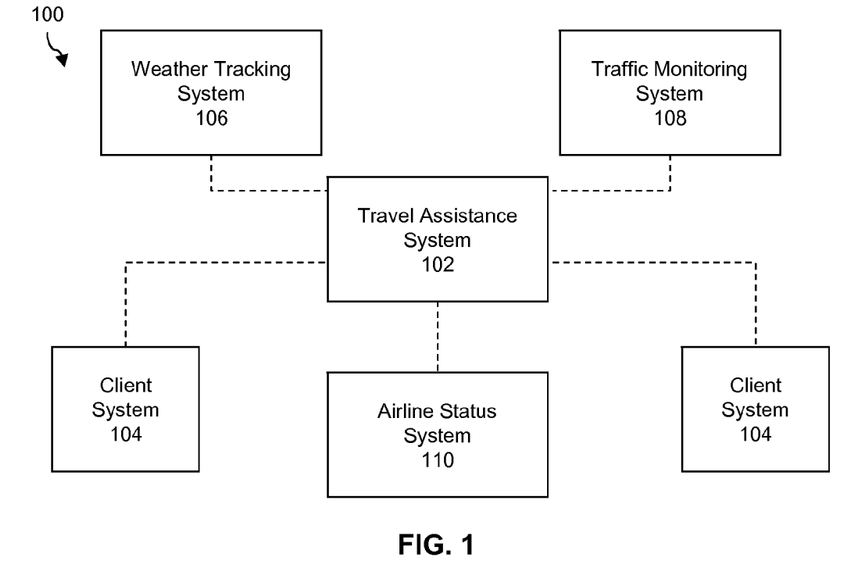
FIG. 1 is a block diagram representation of a system that may be used to implement one embodiment of providing departure notification using a travel assistance system.

Referring to FIG. 1, a block diagram representation of an example of a network system 100 that may be used to implement one embodiment of providing departure notification from a travel assistance system 102 is shown. When a user expects to travel from a source location to a destination location and wishes to arrive at the destination location by approximately a desired destination arrival time, the user may request a departure notification from a travel assistance system 102. The departure notification includes a departure time that enables a traveler to depart from the source location at the departure time and arrive at the destination location as approximately the desired destination arrival time. The user interfaces with the travel assistance system 102 via a client system 104. Examples of client systems 104 include, but are not limited to a personal computer, a pocket personal computer, a personal assistant and a cellular telephone.

In one embodiment, communicative coupling between the client system 104 and the travel assistance system 102 is established via a networking infrastructure. In one embodiment, communicative coupling between the client system 104 and the travel assistance system 102 is established via an Internet network. In one embodiment, communicative coupling between the client system 104 and the travel assistance system 102 is established via a wireless communication system. In one embodiment, communicative coupling between the client system 104 and the travel assistance system 102 is established via a wired communication system. In one embodiment, communicative coupling between the client system 104 and the travel assistance system 102 is established via a combination of a wireless and wired communication system.

In one embodiment, the same client system 104 is used to issue a request for a departure notification to the travel assistance system 102 and to receive the departure notification from the travel assistance system 102. In one embodiment, a first client system 104 is used to issue a request for a departure notification and a second client system 104 receives the departure notification. In one embodiment, the user specifies the second client system 104 as a component of the departure notification request.

The user contacts the travel assistance system 102 via a client system 104 and issues a departure notification request. The departure notification request includes the source location, the destination location and the desired destination arrival time. The travel assistance system 102 interfaces with one or more different support systems 106, 108, 110 and acquires one or more travel parameters that may impact departure time from the source location to the destination location. Examples of support systems 106, 108, 110 include, but are not limited to a weather tracking system 106, a traffic monitoring system 108 and an airline status system 110.

The weather tracking system 106 provides the travel assistance system 102 with weather data that may impact the departure time from the source location to the destination location. An example of weather data includes, but is not limited to, predicted weather conditions during the expected time of travel from the source location to the destination location.

The traffic monitoring system 108 provides traffic related data that may impact the travel time between the source location and the destination location and thereby impact the departure time from the source location. Examples of traffic related data include, but are not limited to traffic flow data, traffic congestion data, accident data, road conditions data, road construction data, road closings data and detour data.

In one embodiment, when the destination location is an airport, the user is provided with the option of providing airport and flight information that facilitates the collection of travel parameter data by the travel assistance system 102 from the airline status system 110. The airline status system 110 provides airport status data and/or flight status data to the travel assistance system 102. In one embodiment, an airport status system provides airport status data and a flight status system provides flight status data. Examples of airport status data include, but are not limited to, airport parking data, airport security line data and airport check-in line data. Examples of flight status data include, but are not limited to, flight schedule data, flight delay data and flight cancellation data.

It should be noted that while a number of different support systems that operate to provide one or more different types of travel parameters to the travel assistance system 102 have been described, alternative types of support system that provide other types of travel parameters that may impact travel time from a source location to a destination location and thereby impact the departure time from the source location may be used.

The travel assistance system 102 determines a departure time from the source location that will enable the user to arrive at the destination location at approximately the desired destination arrival time based on the source location, the destination location, the desire destination arrival time and the acquired one or more travel parameters. The travel assistance system 102 transmits a departure notification including the departure time to a client system 104. In one embodiment, the departure notification includes the source location and the destination location. In one embodiment, the departure notification includes the one or more travel parameters that impact the departure time from the source location to the destination location.

In one embodiment, the client system 104 is communicatively coupled to an alarm system. The alarm system is triggered in response to receipt of the departure notification at the client system 104. In one embodiment, the client system 104 is integrated with the alarm system. In one embodiment, the client system 104 is communicatively coupled to the alarm system.

In one embodiment, the alarm system is communicatively coupled to the client system 104 via a wireless communication channel. In one embodiment, the alarm system is communicatively coupled to the client system 104 via a short range wireless communication channel. In one embodiment, the alarm system is communicatively coupled to the client system 104 via Bluetooth communication channel. In one embodiment, the alarm system is communicatively coupled to the client system 104 via a wired communication channel.

In one embodiment, the departure notification is sent from the travel assistance system 102 to the client system 104 at approximately the departure time. In one embodiment, the user may request that the departure notification be sent in advance of the departure time. In one embodiment, the user provides the travel assistance system 102 with an advance notice time period. The travel assistance system 102 determines a departure notification transmission time for issuing the departure notification from the travel assistance system 102 to the client system 104 based on the advance notice time period. More specifically, the travel assistance system 102 issues the departure notification a time equivalent to approximately the advance notice time period in advance of the departure time. In one embodiment, the travel assistance system 102 uses a default advance notice time period.

In one embodiment, the user provides a mode of transportation to the travel assistance system 102. Examples of modes of transportation include, but are not limited to, an automobile and a bicycle. The mode of transportation is used by the travel assistance system 102 to determine the travel time from the source location to the destination location and thereby determine the departure time from the source location.

In one embodiment, the user is provided with the option of providing a source location, an intermediate location, a destination location and a desired destination arrival time as a component of the departure notification request. For example, if a user wishes to travel from his home to the airport and make a stop at the bank on the way to the airport. The source location is the home, the intermediate location is the bank and the destination location is the airport. The travel assistance system 102 interfaces with one or more different support systems 106, 108, 110 and acquires one or more travel parameters that may impact the departure time from the source location to the destination location via the intermediate location. The travel assistance system 102 determines a departure time from the source location that enables the user to arrive at the destination location via the intermediate location at approximately the desired destination arrival time.

In one embodiment, the user is provided with the option of providing a stopping time at the intermediate location as a component of the departure notification request. The travel assistance system 102 considers the stopping time in determining the departure time from the source location.

Figure 2:
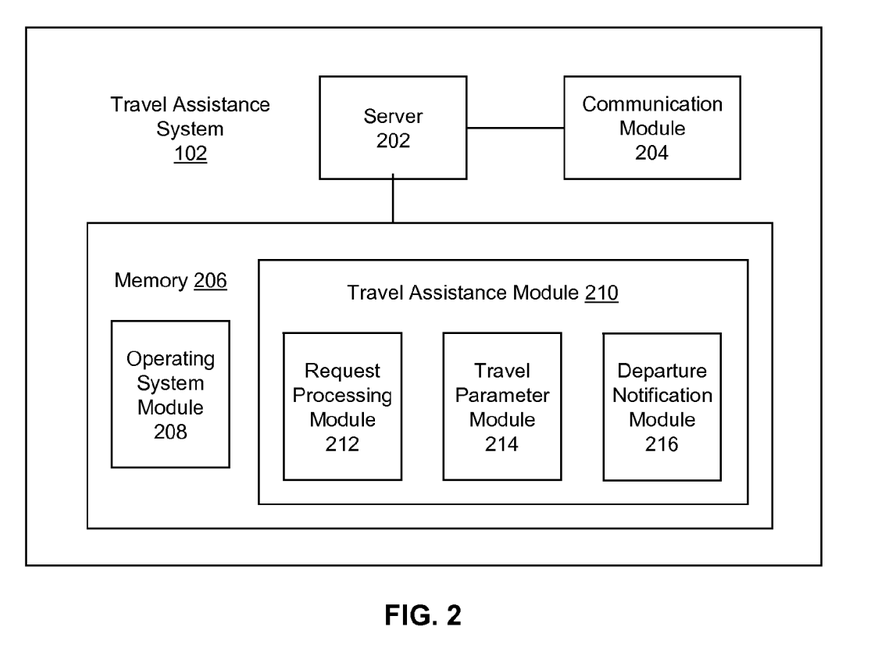
FIG. 2 is a block diagram representation of one embodiment of a travel assistance system.

Referring to FIG. 2, a block diagram representation of one embodiment of travel assistance system 102 is shown. The travel assistance system 102 generally includes a server 202, a communication module 204, and a memory 206. The server 202 includes a processor or controller. The communication module 204 facilitates communications between the travel assistance system 102 and other devices. Examples of such devices include, but are not limited to one or more client systems 104 and one or more support systems 106, 108, 110. In one embodiment, the communication module 204 supports communication via a networking infrastructure. In one embodiment, the communication module 204 supports communication via the Internet. In one embodiment, the communication module 204 supports wireless communication. In one embodiment, the communication module 204 supports wired communication.

In one embodiment, an operating system module 208 and a travel assistance module 210 are stored in the memory 206. The travel assistance module 210 generally processes departure notification requests received from client systems 104 and issues departure notifications. Alternative embodiments of the travel assistance system 102 may include additional modules that facilitate the operation of the travel assistance system 102.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The server 202 generally retrieves and executes machine readable instructions or software programs that are stored in the memory 206.

In one embodiment, the travel assistance module 210 includes a request processing module 212, a travel parameter module 214 and a departure notification module 216. The request processing module 210 generally receives and processes departure notification requests received from client systems 104 at the travel assistance system 102. In one embodiment, the departure notification request includes a source location, a destination location and a desired destination arrival time. In one embodiment, the departure notification request includes airport information and flight information. In one embodiment, the departure notification specifies a client system 104 for receipt of the departure notification. In one embodiment, the departure notification request includes an advance notice time period. In one embodiment, the departure notification request includes a mode of transportation.

The travel parameter module 214 generally identifies potentially relevant time parameters that may impact the departure time from the source location to the destination location and coordinates the acquisition of the identified travel parameters from one or more support systems 106, 108, 110.

In one embodiment, the user identifies the desired route from the source location to the destination location in the departure notification request. The travel assistance system 102 establishes a communication channel with the traffic monitoring system 108 responsive to a request from the travel parameter module 214 and requests traffic related data that may impact travel time along the specified route and thereby impact the departure time from the source location. Examples of the types of traffic related data received from the traffic monitoring system 108 at the travel assistance system 102 include, but are not limited to traffic flow data, traffic congestion data, accident data, road conditions data, road construction data, road closings data and detour data.

In one embodiment, the travel parameter module 214 identifies multiple alternative routes from the source location to the destination location. The travel assistance system 102 requests traffic related data associated with each of the different routes from the traffic monitoring system 108 and determines the most time efficient route of the identified routes from the source location to the destination location. The route identified as the most time efficient route is included in the departure notification sent from the travel assistance system 102 to the client system 104.

In one embodiment, the travel assistance system 102 establishes a communication channel with the weather tracking system 106 responsive to a request from the travel parameter module 214. The weather tracking system 106 provides weather data that may impact the travel time between the source location and the destination location and thereby impact departure time from the source location. An example of weather data includes, but is not limited to, predicted weather conditions during the expected time of travel from the source location to the destination location.

In one embodiment, if the time travel parameter module 214 determines that the destination location is an airport, the time travel parameter module 214 issues a request to the travel assistance system 102 to establish a communication channel with the airline status system 110. In one embodiment, the airline status system 110 provides airport specific information to the travel assistance system 102. The airport specific information or airport status data include, but are not limited to, airport parking data, airport security line data and airport check-in line data.

In one embodiment, when the destination location is an airport, the user is provided with the option of providing flight information as a component of the departure notification request. If the travel parameter module 214 determines that the user has provided flight information, the travel parameter module 214 requests flight status data from the airline status system 110. Examples of flight status data include, but are not limited to, flight schedule data, flight delay data and flight cancellation data.

It should be noted that while a number of different support systems that operate to provide one or more different types of travel parameters to the travel assistance system 102 have been described, alternative types of support system that provide other types of travel parameters that may impact departure time from a source location to enable arrival at a destination location by approximately the desired destination arrival time may be used. Also while a number of different travel parameters have been identified as being provided by specific support systems, alternative support systems may be used to provide the described time travel parameters. Furthermore, the described support systems may provide a greater or few number of travel parameters than those described.

The departure notification request and the acquired travel parameters are forwarded to the departure notification module 216 for processing. The departure notification module 216 generally determines a departure time that will enable a user to travel from the source location to the destination location and arrive at the destination location at approximately a desired destination arrival time and generates a departure notification for transmission to the client system 104.

The departure notification module 216 uses the acquired travel parameters to determine the travel time from the source location to the destination location. The departure notification module 216 also uses the acquired travel parameters to determine any delays associated with travel. The departure notification module 216 uses the determined travel time and any determined delays to derive the departure time from the source location that will enable the user to arrive at the destination location at approximately the desired destination arrival time. The departure notification includes the departure time. In one embodiment, the departure notification includes the route from the source location to the destination location. In one embodiment, the departure notification includes a summary of one or more of the travel parameters that have been determined to the departure time from the source location.

The departure notification module 216 coordinates the transmission of the departure notification to the appropriate client system 104. In one embodiment, the departure notification is transmitted to the same client system 104 that generated the departure notification request. In one embodiment, the departure notification request includes a specific client system 104 for transmission of the departure notification. The departure notification module 216 coordinates the transmission of the departure notification to the specified client system 104.

In one embodiment, the travel assistance system 102 transmits the departure notification at approximately the departure time. In one embodiment, the user is provided with the option of providing a advance notice time period as a component of the departure notification request. In one embodiment, the departure notification module 216 uses a default advance notice time period in the event the user fails to provide an advance time notice period. In one embodiment, the departure notification module 216 uses a pre-determined advance notice time period. The departure notification module 216 determines a departure notification transmission time for issuing the departure notification from the travel assistance system 102 to the client system 104 based on the advance notice time period. More specifically, the travel assistance system 102 issues the departure notification a time equivalent to approximately the advance notice time period in advance of the departure time.

Figure 3:
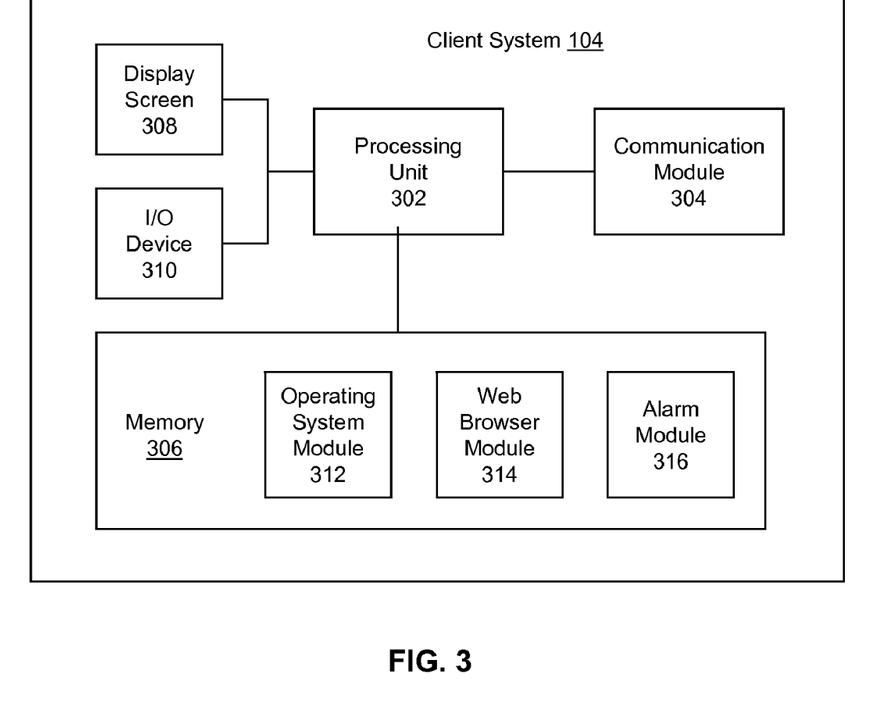
FIG. 3 is a block diagram representation of one embodiment of a client system.

Referring to FIG. 3, a block diagram representation of one embodiment of a client system 104 is shown. The client system 104 generally includes a processing unit 302, a communication module 304, a memory 306, a display screen 308, and one or more input/output devices 310.

The processing unit 302 generally includes a processor or controller. In one embodiment, the communication module 304 generally facilitates the exchange of data between the client system 104 and other devices. In one embodiment, the communication module 304 facilitates the exchange of data between the client system 104 and the travel assistance system 102. In one embodiment, the communication module 304 supports communication via a networking infrastructure. In one embodiment, the communication module 304 supports communication via the Internet. In one embodiment, the communication module 304 supports wireless communication. In one embodiment, the communication module 304 supports short range wireless communication. In one embodiment, the communication module 304 supports Bluetooth communication. In one embodiment, the communication module 304 supports wired communication.

Figure 4:
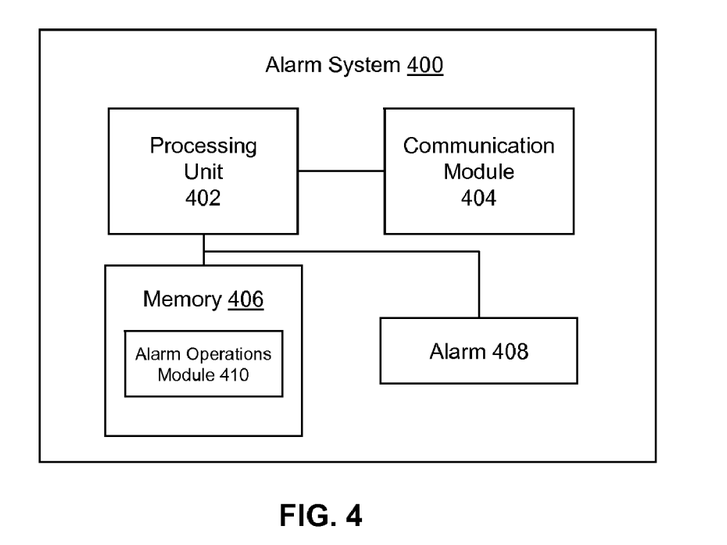
FIG. 4 is a block diagram representation of one embodiment of an alarm system.

In one embodiment, an operating system module 312, a web browser module 314 and an alarm module 316 are stored in the memory 306. In one embodiment, the web browser module 314 enables the client system 104 to exchange data with the travel assistance system 102 via the Internet. The alarm module 316 operates as an interface to the alarm system 400. More specifically, upon receipt of a departure notification from a travel assistance system 102, the alarm module 316 responsively issues a command to trigger the alarm system 400. In this embodiment, the alarm system 400 is illustrated as being a separate system that is communicatively coupled to the client system 104. In another embodiment, the alarm system may be integrated with the client system 104.

In one embodiment, the memory 306 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 302 generally retrieves and executes machine readable instructions or software programs that are stored in the memory 306.

Referring to FIG. 4, a block diagram representation of one embodiment of an alarm system 400 is shown. The alarm system 400 generally includes a processing unit 402, a communication module 404, a memory 406 and an alarm 408. An alarm operations module 410 is stored in the memory 406. In one embodiment, upon receipt of a departure notification from a travel assistance system 102 at a client system 104, the alarm module 316 in the client system 104 responsively transmits an alarm trigger signal to the alarm system 400. Upon receipt of the alarm trigger signal at the alarm system 400, the alarm operations module 410 responsively coordinates activation of the alarm 408.

The processing unit 402 generally includes a processor or controller. The communication module 404 generally operates to receive an alarm trigger signal from other devices. In one embodiment, the communication module 404 operates to receive an alarm trigger signal from a client system 104.

In one embodiment, the communication module 404 supports communication via a networking infrastructure. In one embodiment, the communication module 404 supports communication via the Internet. In one embodiment, the communication module 404 supports wireless communication. In one embodiment, the communication module 404 supports short range wireless communication. In one embodiment, the communication module 404 supports Bluetooth communication. In one embodiment, the communication module 404 supports wired communication.

In one embodiment, the memory 406 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 402 generally retrieves and executes machine readable instructions or software programs that are stored in the memory 406.

Figure 5:
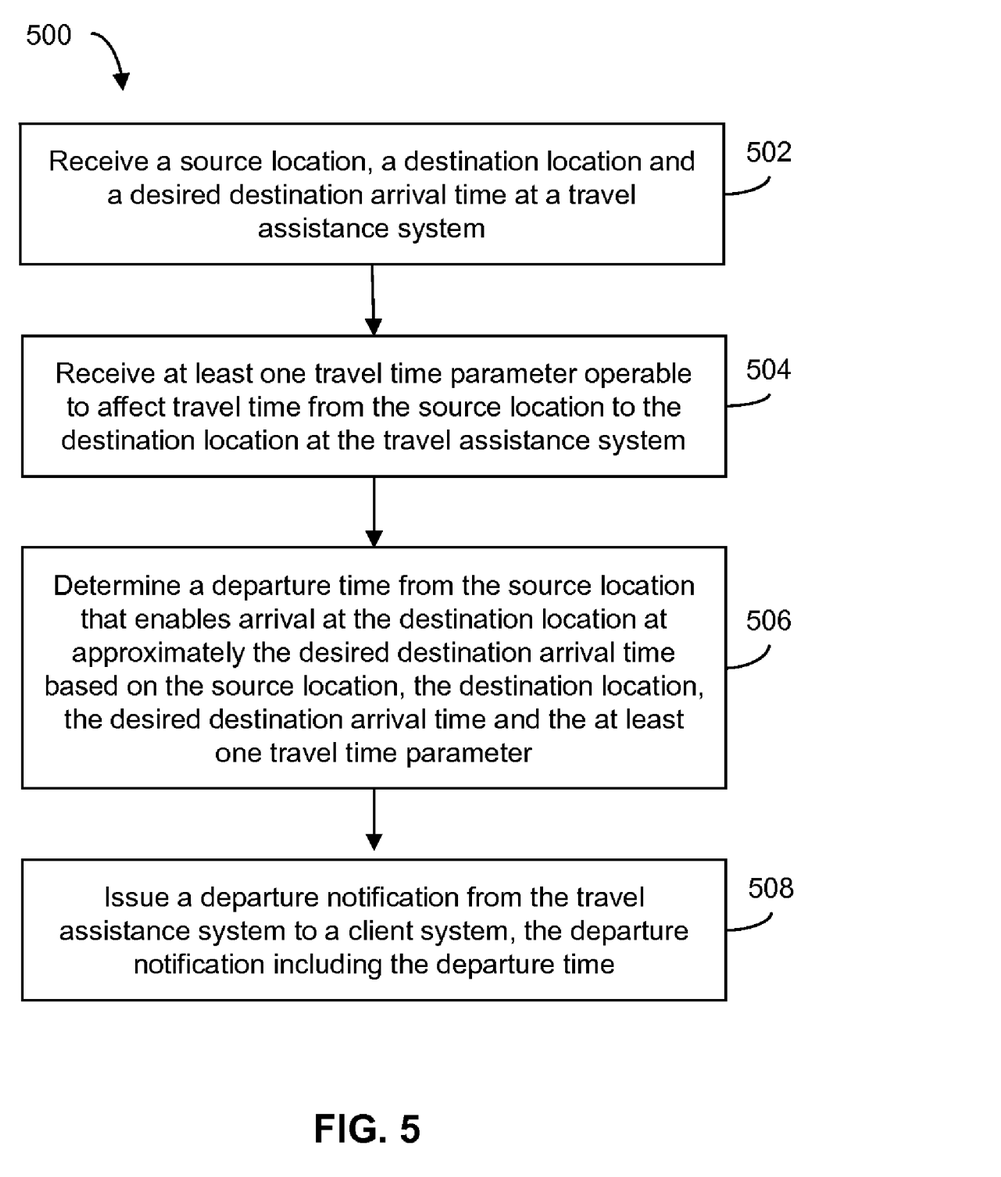
FIG. 5 is a flowchart representation of one embodiment of a method of providing departure notification using a travel assistance system.

Referring to FIG. 5, a flowchart representation of one embodiment of a method 500 of providing departure notification using a travel assistance system 102 is shown. A source location, a destination location and a desired destination arrival time is received at a travel assistance system 102 at step 502. At least one travel parameter operable to affect departure time from the source location to the destination location is received at the travel assistance system 102 at step 504. A departure time from the source location that enables arrival at the destination location at approximately the desired destination arrival time based on the source location, the destination location, the desired destination arrival time and the at least one travel parameter is determined at step 506. A departure notification is issued from the travel assistance system 102 to a client system 104 at step 508. The departure notification includes the departure time. While the steps in the method 500 have been described in a particular order, the steps may be performed in a different order or additional steps may be performed in addition to the described steps.

In one embodiment, a computer readable medium stores a computer executable program for providing a departure notification from a travel assistance system 102. A computer readable medium includes computer readable code for receiving a source location, a destination location and a desired destination arrival time at a travel assistance system 102, computer readable code for receiving at least one travel parameter operable to affect departure time from the source location to the destination location at the travel assistance system 102, computer readable code for determining a departure time from the source location that enables arrival at the destination location at approximately the desired destination arrival time based on the source location, the destination location, the desired destination arrival time and the at least one travel parameter, and computer readable code for issuing a departure notification from the travel assistance system 102 to a client system 104, the departure notification including the departure time.

In one embodiment, a system for providing a departure notification from a travel assistance system includes a request processing module 212 operable to receive a source location, a destination location and a desired destination arrival time at a travel assistance system 102, a travel parameter module 214 operable to receive at least one travel parameter operable to affect departure time from the source location to the destination location at the travel assistance system 102, and a departure notification module 216 operable to determine a departure time from the source location that enables arrival at the destination location at approximately the desired destination arrival time based on the source location, the destination location, the desired destination arrival time and the at least one travel parameter and to issue a departure notification from the travel assistance system 102 to a client system 104, the departure notification including the departure time.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of providing a departure notification from a travel assistance system, the method comprising:
receiving, by the travel assistance system, a source location, a destination location, information related to a transportation commodity at the destination location, and a desired destination arrival time at the destination location;
receiving, by the travel assistance system, travel parameter data from a transportation status system based on the information related to the transportation commodity at the destination location;
determining a departure time from the source location that enables arrival at the destination location at approximately the desired destination arrival time based on the source location, the destination location, the desired destination arrival time and the travel parameter data; and
issuing a departure notification from the travel assistance system to a client system, the departure notification including the departure time.

2. The method of claim 1, further comprising establishing communicative coupling between the travel assistance system and the client system via a system selected from a group consisting of a network infrastructure, an Internet network, wireless communication system, a wired communication system and a combination wireless and wired communication system.

3. The method of claim 1, wherein receiving the travel parameter data comprises receiving travel parameter data selected from a group consisting of weather data, traffic flow data, traffic congestion data, accident data, road conditions data, road construction data, road closing data, detour data, airport parking data, airport security line data, airport check-in line data, flight schedule data, flight delay data and flight cancellation data.

4. The method of claim 1, wherein the client system is to trigger an alarm system responsive to receipt of the departure notification.

5. The method of claim 1, wherein issuing the departure notification to the client system comprises issuing a departure notification to a client system selected from a group consisting of a client system integrated with an alarm system and a client system communicatively coupled to an alarm system.

6. The method of claim 1, wherein issuing the departure notification to the client system comprises issuing a departure notification to a client system operable to be communicatively coupled to an alarm system via a communication channel selected from a group consisting of a wireless communication channel, a short range wireless communication channel, a Bluetooth communication channel and a wired communication channel.

7. The method of claim 1, wherein issuing the departure notification to the client system comprises issuing a departure notification to a client system selected from a group consisting of a personal computer, a personal assistant, a cellular telephone and a pocket personal computer.

8. The method of claim 1, further comprising:
identifying an advance notice time period;
determining a departure notification transmission time for issuing the departure notification from the travel assistance system to the client system based on the advance notice time period; and
issuing the departure notification from the travel assistance system to the client system at approximately the departure notification transmission time.

9. The method of claim 1, further comprising receiving a transportation mode to enable travel from the source location to the destination location, and
wherein determining the departure time from the source location that enables arrival at the destination location at approximately the desired destination arrival time comprises determining a departure time from the source location that enables arrival at the destination location at approximately the desired destination arrival time based on the transportation mode.

10. A non-transitory computer readable medium storing a computer executable program to cause a processor to provide a departure notification from a travel assistance system, comprising computer readable code to:
receive a source location, a destination location, information related to a transportation commodity at the destination location, and a desired destination arrival time at the destination location;
receive travel parameter data from a transportation status system based on the information related to the transportation commodity at the destination location;
determine a departure time from the source location that enables arrival at the destination location at approximately the desired destination arrival time based on the source location, the destination location, the desired destination arrival time and the travel parameter data; and
issue a departure notification from the travel assistance system to a client system, the departure notification including the departure time.

11. The computer readable medium of claim 10, further comprising computer readable code to establish communicative coupling between the travel assistance system and the client system via a system selected from a group consisting of a network infrastructure, an Internet network, wireless communication system, a wired communication system and a combination wireless and wired communication system.

12. The computer readable medium of claim 10, wherein the computer readable code to receive the travel parameter data comprises computer readable code to receive travel parameter data selected from a group consisting of weather data, traffic flow data, traffic congestion data, accident data, road conditions data, road construction data, road closing data, detour data, airport parking data, airport security line data, airport check-in line data, flight schedule data, flight delay data and flight cancellation data.

13. The computer readable medium of claim 10, wherein the client system is to trigger an alarm system responsive to receipt of the departure notification.

14. The computer readable medium of claim 10, wherein the computer readable code to issue the departure notification to the client system comprises computer readable code to issue a departure notification to a client system selected from a group consisting of a client system integrated with an alarm system and a client system communicatively coupled to an alarm system.

15. The computer readable medium of claim 10, wherein the computer readable code to issue the departure notification to the client system comprises computer readable code for issuing a departure notification to a client system operable to be communicatively coupled to an alarm system via a communication channel selected from a group consisting of a wireless communication channel, a short range wireless communication channel, a Bluetooth communication channel and a wired communication channel.

16. The computer readable medium of claim 10, wherein the computer readable code to issue the departure notification to the client system comprises computer readable code for issuing a departure notification to a client system selected from a group consisting of a personal computer, a personal assistant, a cellular telephone and a pocket personal computer.

17. The computer readable medium of claim 10, further comprising:
computer readable code to identify an advance notice time period; and
computer readable code to determine a departure notification transmission time for issuing the departure notification from the travel assistance system to the client system based on the advance notice time period; and
computer readable code to issue the departure notification from the travel assistance system to the client system at approximately the departure notification transmission time.

18. The computer readable medium of claim 10, further comprising computer readable code to receive a transportation mode to enable travel from the source location to the destination location, and
wherein the computer readable code to determine the departure time from the source location that enables arrival at the destination location at approximately the desired destination arrival time comprises computer readable code to determine a departure time from the source location that enables arrival at the destination location at approximately the desired destination arrival time based on the transportation mode.

19. A system for providing a departure notification from a travel assistance system, the system comprising:
a request processing module to receive a source location, a destination location, information related to a transportation commodity at the destination location, and a desired destination arrival time at the destination location;
a travel parameter module to receive travel parameter data from a transportation status system based on the information related to the transportation commodity at the destination location; and
a departure notification module to determine a departure time from the source location that enables arrival at the destination location at approximately the desired destination arrival time based on the source location, the destination location, the desired destination arrival time and the travel parameter data and to issue a departure notification from the travel assistance system to a client system, the departure notification including the departure time.

20. The system of claim 19, wherein the departure notification module is to identify a departure preparation time period, to determine a departure notification transmission time for issuing the departure notification from the travel assistance system to the client system based on the departure preparation time period and to issue the departure notification from the travel assistance system at approximately the departure notification transmission time.

* * * * *